United States Patent [19]

Darvishian

[11] 3,897,170

[45] July 29, 1975

[54] WIND MOTOR

[76] Inventor: Arthur Darvishian, 5314 Sheridan Dr., Williamsville, N.Y. 14221

[22] Filed: Jan. 9, 1974

[21] Appl. No.: 432,031

[52] U.S. Cl. ................ 416/119; 416/111; 416/140; 416/197
[51] Int. Cl. ............................................. F03d 3/06
[58] Field of Search ............ 416/111, 119, 140, 197

[56] References Cited
UNITED STATES PATENTS

| | | | |
|---|---|---|---|
| 272,489 | 2/1883 | Sherwood | 416/119 |
| 1,314,232 | 8/1919 | Wohr | 416/119 |
| 1,535,585 | 4/1925 | Dyer | 416/118 |
| 2,224,851 | 12/1940 | Lea | 416/197 X |
| 3,020,963 | 2/1962 | Hakkarinen | 416/196 A |

FOREIGN PATENTS OR APPLICATIONS

| | | | |
|---|---|---|---|
| 646,071 | 7/1928 | France | 416/117 |
| 745,869 | 2/1933 | France | 416/119 |
| 913,964 | 6/1946 | France | 416/197 |
| 19,401 | 1891 | United Kingdom | 416/197 |

*Primary Examiner*—Everette A. Powell, Jr.
*Attorney, Agent, or Firm*—Raymond F. Kramer

[57] ABSTRACT

A wind motor for the conversion of wind power to mechanical or electrical power or other form thereof comprises a vertical rotatable shaft having cup-shaped wind receptors connected to it and extending horizontally from it, which receptors are so mounted at the ends of arms extending from a central rotatable shaft as to move from positions of maximum resistance to the wind when moving with the wind to positions of minimum wind resistance when moving against the wind, and in positions of maximum wind resistance conform in shape with and bear against said arms. In modifications of the invention the receptors may be modified to asymmetric shapes and the cups may be flattened or otherwise changed, as desired, the shaft may be positioned other than vertically and the receptors may rotate in a plane other than the horizontal, but in such cases the plane of rotation of the receptors will be parallel to the wind. The movements of the receptors so as to maintain wind resistance or absence thereof at certain times during shaft rotation are desirably maintained by tethering and cushioning means connected to them, as well as by a pivoting mounting of the receptors so as to take advantage of centrifugal forces.

Preferably, the wind power transmitted to the rotating shaft is converted to electrical power, which may be stored for future use as chemical power, as in batteries or as mechanical power in magnetically suspended, high speed flywheels, or it may be used directly, as in powering transportation means, pumps or other mechanical equipment.

16 Claims, 7 Drawing Figures

PATENTED JUL 29 1975
3,897,170
SHEET 1
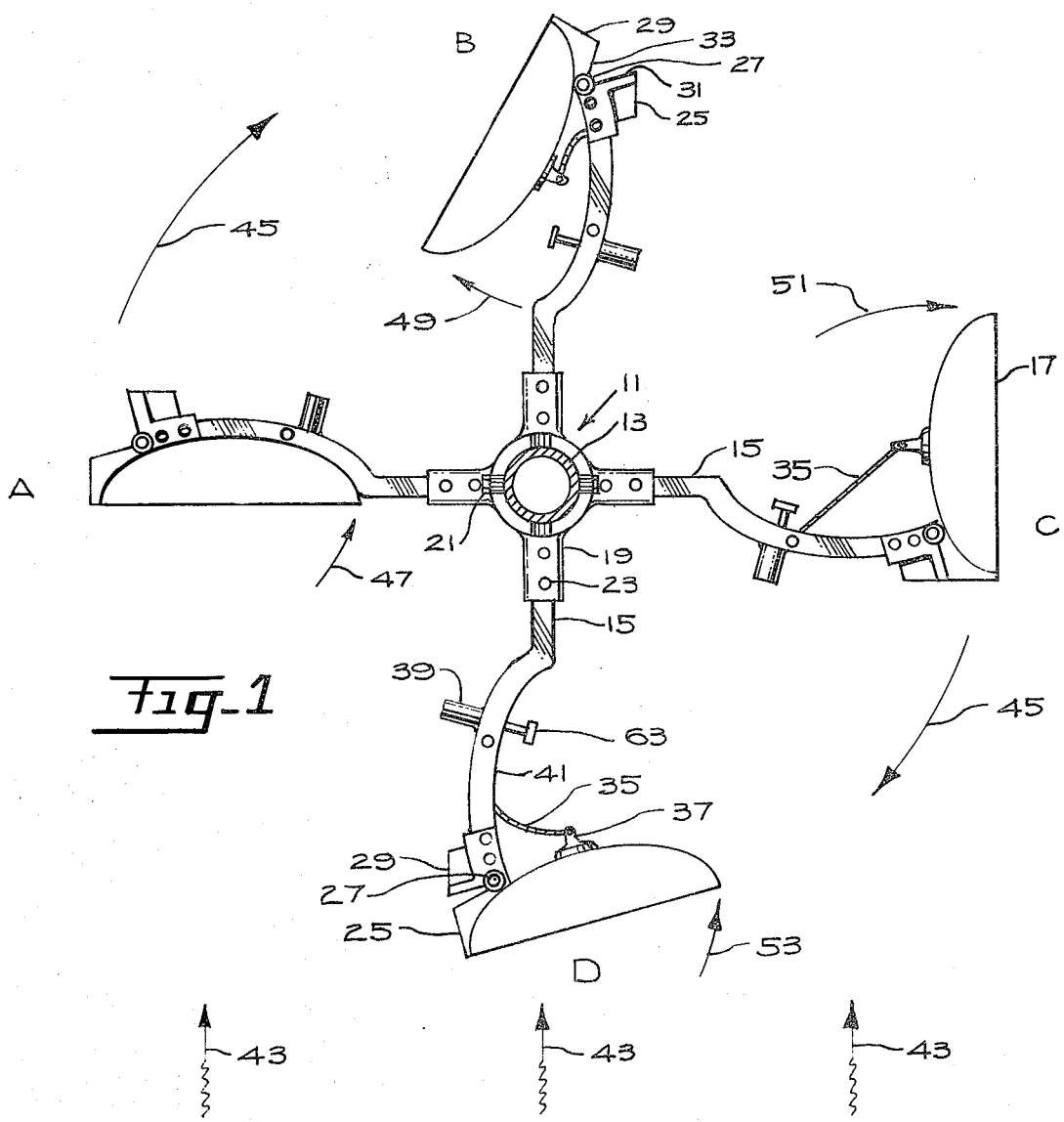
Fig_1
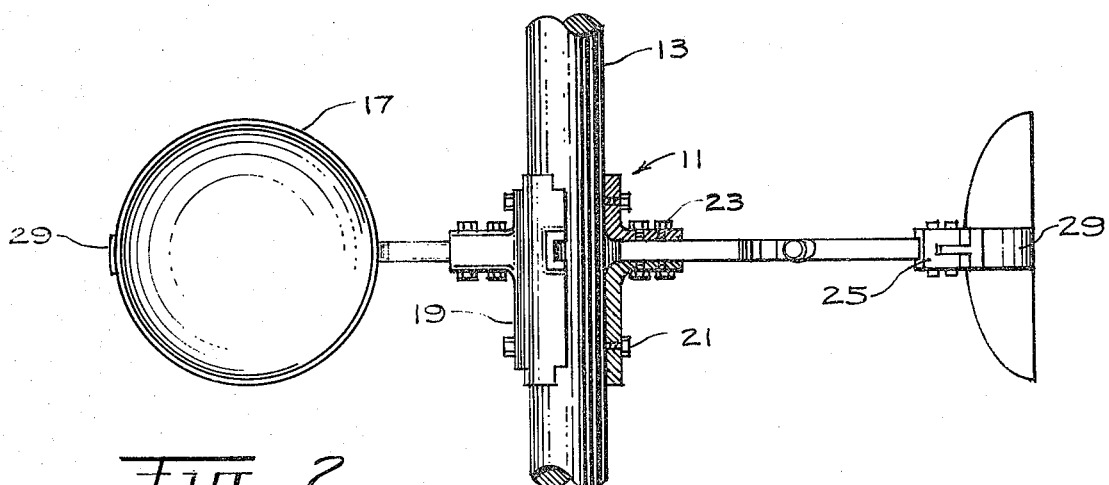
Fig_2

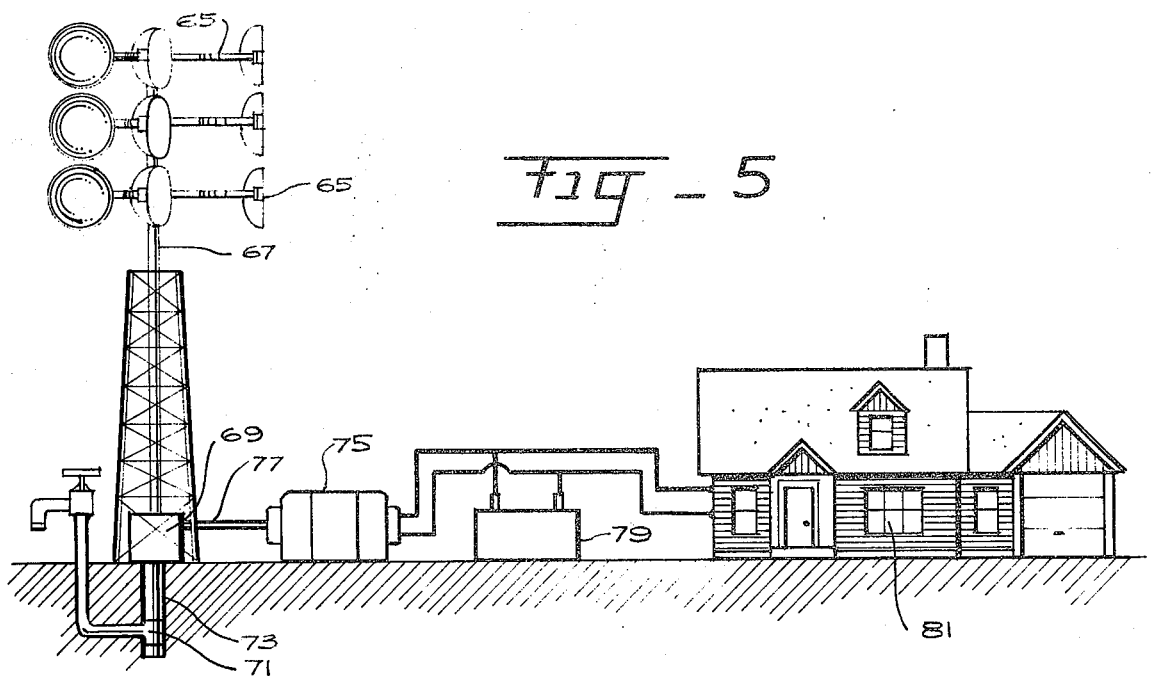
fig_5
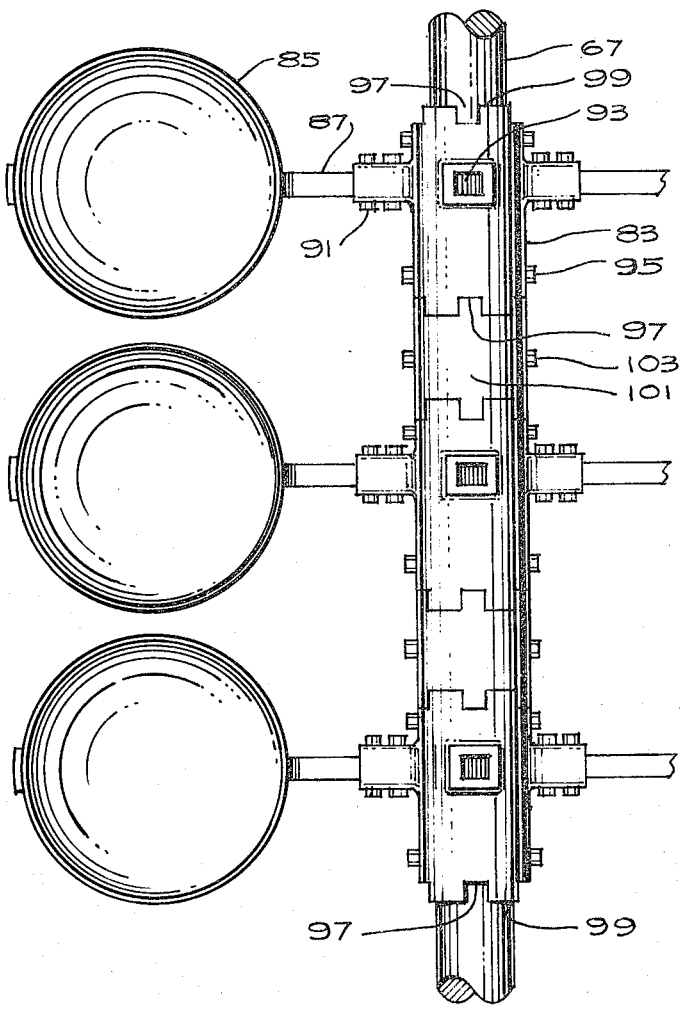
fig_4

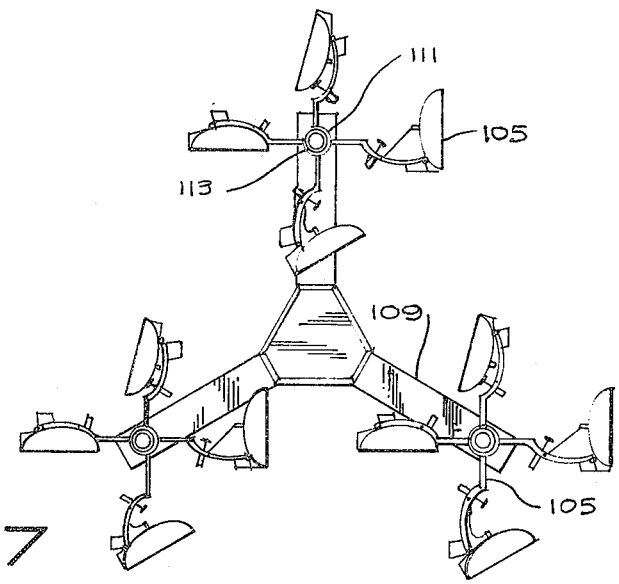
Fig_7
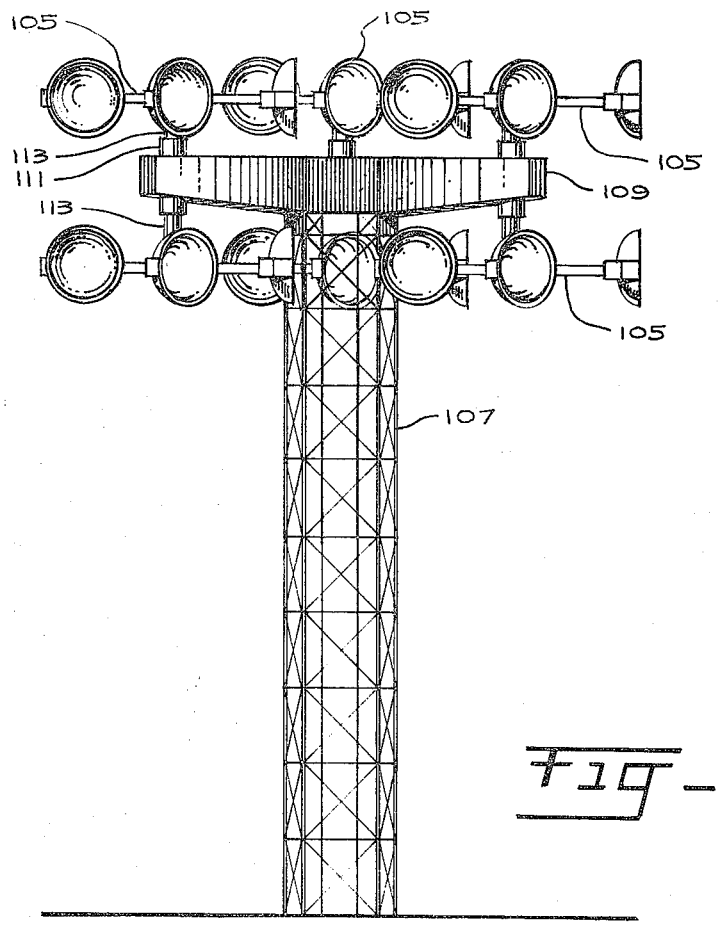
Fig_6

WIND MOTOR

Windmills have been used for centuries to provide a means for utilizing the power of the wind to perform useful work. They usually include an elevated central, horizontally rotatable shaft having a plurality of vanes attached to it which rotate in a vertical plane in response to the wind, turning the shaft, which is usually geared to a vertical shaft that transmits its movement to ground level. The combination of radiating vanes and horizontal shaft is maintained facing into the wind by the action of a rudder-like vane positioned vertically and transversely with respect to the plane of rotation of the vanes. The turning of the vertical shaft may, through appropriate gearing or other arrangements, be utilized to drive various mechanical devices such as water pumps, grinding mills, or the like. Alternatively, the power provided by such wind motors may be used to drive an electrical generator or alternator, thereby providing a means for converting wind power to electrical power.

In addition to conventional windmills other forms of wind power operated motors have been made. Thus, wind motors, a more generic term than windmills, include those wherein the wind receptors are a plurality of blades, "propellers", cups, vanes, hemispheres or of other shapes, which may be moved by the wind to turn in response to wind pressure. The plane of rotation of such a wind motor may be either perpendicular to the direction of the wind, as in the blade or propeller type of wind motor or parallel to the direction of the wind, as in a cup-driven type of wind motor. Wind motors of the latter type, having a plane of rotation parallel to the wind, provide significant advantages over the more common vane or propeller type of wind motor. For example, the vertical shaft for transmission of power can be rotated without the necessity of an intermediate gearing means to change the direction of rotation and when the cups or equivalent structures are rotatable in a horizontal plane wind direction changes do not seriously affect the efficiency of the motor and do not require movement of the windmill or the receptors, as a unit, to face into the wind.

The cup-type of wind motor of the prior art may comprise a rotatable, vertical shaft having a plurality of wind receptors extending radially therefrom in a horizontal plane. Because the plane of rotation is parallel to the wind the receptors are pushed by the wind during one part of their cycle of rotation and opposed by the wind during the return part of the cycle. To diminish wind resistance during the return part of the cycle wind receptors in the forms of cups or hemispheres have been used. With such designs the open portion or concave surface of the receptor is pushed by the wind and the convex or outer portion provides a streamlined surface and thus minimizes wind resistance during the return portion of the cycle. However, even with such designs wind resistance is substantial and is a factor limiting the efficiency of such devices.

Accordingly, it is an object of the present invention to provide a self-adjusting or automatically bypassing wind motor or turbine wherein the plane of rotation is parallel to the direction of the wind, preferably being horizontal, so that no matter in which direction the wind blows the motor will be operative without requiring positioning of the motor to face the wind, and wherein the limiting factor of wind resistance is substantially reduced.

It is also an object of the invention to provide a wind motor or turbine of increased efficiency and of an improved resistance to vibration during operation.

It is an object to provide a wind motor useful in the conversion of wind power to mechanical, electrical or other form of power. It is a still further object to provide an improved propulsion means for vehicles, boats and other craft which incorporates such a wind motor or turbine to power belt wheel, propeller, screw, paddle, track, cog or other propulsion means.

Furthermore, it is an object of the invention to produce a commercially feasible, readily manufactured wind motor or turbine which is adaptable to high and low wind speeds and which can be modified by addition or subtraction of wind receptors, partial featherings thereof or by movings inwardly (toward the shaft) or outwardly along the supporting arms, of receptor elements to increase or decrease power developed. It is also an object to make a combination of wind motors in which the rotating shafts are connected to increase power output, or operate independently, each powering machines or generators.

These and other objects are accomplished by the present invention. In accordance with the invention a self-adjusting wind motor comprises a wind receptor that moves substantially in a plane of the wind and is automatically presented to the wind in a position of high wind resistance when moving in the direction of the wind and is moved into a position of low wind resistance when moving against the wind, said automatic self-adjustment of position being caused by the action of the wind and centrifugal force on the receptor. In a preferred embodiment of the invention the wind motor or turbine, hereinafter referred to as a motor, comprises a rotatable shaft having a plurality of wind receptors extending radially therefrom. The assembly of shaft and receptors held to arms is rotatable in response to wind pressure, with the plane of rotation being parallel to the direction of the wind, usually horizontal. Each receptor is pivotally mounted on an outer portion of the related arm to allow it to swing from a position of maximum wind resistance when it is moving in the direction of the wind, to a position of minimum wind resistance, wherein the receptor normally is turned sidewardly to the wind, when it is moving against the wind. Thus, during operation each receptor will receive a maximum impulse from the wind during the power part of its rotation cycle but when it moves in the opposite direction it will be free to swing or pivot in response to wind pressure so as to produce an orientation that affords minimum wind resistance. In the power portion of rotation the receptor, which is of curved or hollow shape, will have the convex or closed side thereof held against the arm, to which it conforms in shape. The invention, the means by which it accomplishes the various objects outlined above and the advantages thereof will be readily understood from the following description, taken in conjunction with the drawing in which:

FIG. 1 is a partially sectional top plan view of a preferred embodiment of the present invention wherein the wind motor comprises four pivotally mounted wind receptor cups, shown in position during rotation in response to the wind;

FIG. 2 is a partially cutaway elevation of a portion of the device of FIG. 1, with two of the receptors and corresponding arms having been removed, for clarity of illustration;

FIG. 4 is a partial elevation of an embodiment of the invention wherein several banks of wind receptors are attached by receptor arms to collars which are fitted to a single shaft;

FIG. 5 is an elevational view schematically illustrating an embodiment of the invention wherein the wind motor comprises several banks of wind receptors attached to a central shaft, the rotation of which pumps water and drives a generator to produce electrical power;

Figure 3:
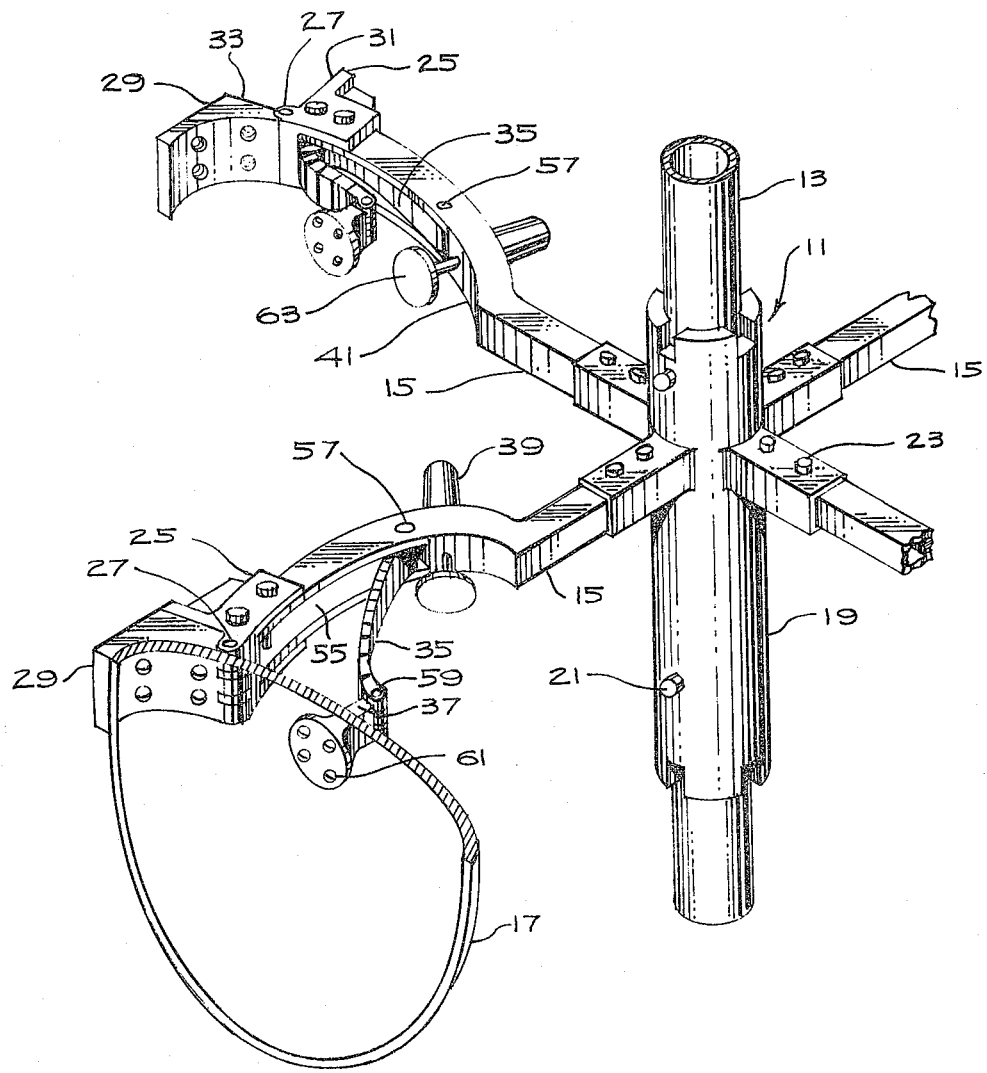
FIG. 3 is a perspective view of a portion of the device of FIG. 1, with parts of two arms and a wind receptor and all of three other wind receptors having been removed, for convenience of illustration.

FIG. 6 is a front elevational view of six banks, (three sets) of four wind receptors each, with receptors of each set mounted in banks above and below mounting bearings, mounted on an elevated support on a tower, with the power generated from the various banks of receptors being separately converted (for each set of banks) to electricity by generators in the support; and FIG. 7 is a top plan view of the wind motor assembly of FIG. 6.

Wind motor 11, which may also be referred to as a wind turbine, as illustrated in FIGS. 1 and 2, includes a vertical rotatable shaft 13 having radially extending from it a plurality, four in this case, of horizontal mounting arms 15 for cup-like receptors 17. The receptor mounting arms are fastened to shaft 13 by means of a collar or bracket 19 having set screws 21 or other means for holding the bracket to the shaft and similar fastening means 23 for fastening the receptors' mounting arms firmly to the collar. Wind receptors 17 are pivotally fastened to arms 15 by means of receptor brackets 25, hinges 27 and terminal arm brackets 29. The brackets are so made that surfaces 31 and 33 thereof make contact when the receptors swing to open or low resistance position, as the receptors move against the wind. Tethers 35, fastened to the receptors at 37 and also joined to the arms in a manner that will be discussed when reference is made to FIG. 3, also help to cushion the contact of the brackets as the receptors move to the open positions. Similarly, spring mechanisms 39 soften the shocks of movements of the receptors into closed positions against the arms 15, which are curved or otherwise shaped, as at hollows 41, to fit the receptors. Mechanisms 39 may be of air cushioned piston-cylinder construction or of any other suitable shock absorbing construction. A preferred feature of these elements is that they serve to encourage movement of the receptor away from the arm after attainment of the closed position, thereby aiding centrifugal force in moving the receptor to the open position quickly, which is of importance at the high speeds at which the wind motor may be operated. They also help to minimize vibration during operation.

As may be seen from FIG. 1, the operation of the wind motor or turbine is essentially automatic or self-adjusting with respect to the positioning of the receptors or cups so as to take full advantage of the force of the wind when in the closed position, as is illustrated at A, wherein the receptor presents maximum resistance to the wind and takes most of its force, while also swinging to open or minimum resistance position C when being returned against the wind, whereby resistance to the wind is minimized as the cup presents its thin side to the wind. At intermediate positions B and D, cup positions while moving to the desired open and closed states, respectively, are shown. Arrows 43 indicate wind direction and arrows 45 show the direction of rotation of the receptors and the motor. Arrows 47, 49, 51 and 53 indicate the paths of movement or the directions of forces on the various receptor cups at the indicated positions during rotation. Thus, at A, arrow 47 shows that the wind force is greater than centrifugal force and presses the cup against the supporting arm, in the closed position. At B the force of the wind now aids centrifugal force in moving the cup away from the support toward open position. At C the receptor is pushed to the open position because the wind force against the cup is much less than the centrifugal force and at D the wind force again becomes significant and starts the receptor toward the closed position of maximum wind resistance and greatest power to the motor.

In FIG. 3 essentially the same motor structure is shown as in FIGS. 1 and 2, but in perspective, with more details of the various parts being depicted. Thus, it is seen that receptor arms 15 are hollow, like shaft 13, and that they are so constructed as to provide recesses 55 for tethers 35, into which the tethers may fit while the receptors are in closed positions. With such a construction the tethers do not limit movement of the receptors and thereby allow them to reach fully closed positions of maximum efficiency when moving with the wind. As is shown, tethers 35 are straps which are held to the arms by pins or other fasteners 57 and to the receptors by pins or fasteners 59, joining them to mounts 37 which are held to receptors 17 by screws 61. In FIG. 3 the mount 37 can be seen through the transparent fiberglass reinforced, light weight polyester receptor. The tether straps are of such a construction as to be readily flexed but are strong enough to resist breaking under the forces applied and despite the repeated flexings. As illustrated, they are of a multiple steel hinge construction, with transverse grooves or other openings on the inner sides thereof, the sides facing the arm recesses. These facilitate correct bending or curving of the straps as the receptors move to closed positions and the straps return to their recesses in the arms. As is shown, shock absorbers 39 have flat contact heads 63 and are not fitted to recesses in the arms. However, such recesses may be provided, similar to those for the tether straps, if desired. Also illustrated in more detail in FIG. 3 are various fasteners for the parts of the wind motor but it is not thought necessary to describe these in further detail since their functions are clear from the drawing.

FIG. 4 depicts the means for interfitting or interconnecting collars 83 (which are like those of FIGS. 1-3) and fastening them to the power shaft 67. Receptors 85, mounted on arms 87 are held to collars 83 by screws 91. The arms enter collar recesses 93. The collars are held to the power shaft by screws 95. While the screws alone can hold the collars in place, additional means are provided. The collars have recesses and projections 97 and 99, respectively, at the ends thereof, which may mate with corresponding parts of other collars or, as in the present illustration, are fitted to an intermediate spacer such as that represented by numeral 101, which is also fastened to the shaft by screws 103. It will be noted that the fitting of the collars and/or spacers together provides a means for orienting the various banks of receptors. As illustrated in FIGS. 4 and 5 they are regularly positioned, with corresponding receptors in the same vertical planes, but these may be staggered, if desired.

In FIG. 5 a plurality of banks of receptor-arm assemblies 65 is shown affixed to a rotatable power shaft 67 which transmits wind power from the assemblies to a transmission or speed changing mechanism 69, from which power is used to operate machinery, such as pump 71, via shaft 73, and preferably, to generate electricity by turning generator 75 via shaft 77. In periods when the electric power generated is not utilizable it may be employed directly, if D.C., and after rectification, if A.C., to charge battery 79. House 81 represents a lighting, utility machine or other load on the circuit, which may be supplied directly from the generator or from the battery. If desired, instead, the electrical energy may be converted to heat and stored until needed, as in a molten salt, brickwork, water or other suitable medium. Also, instead of generating electricity the mechanical power may be stored in a flywheel, e.g., a very low friction, magnetically suspended flywheel.

FIGS. 6 and 7 show tower mounted banks of receptors 105 arranged so as to increase the wind power obtainable (using six banks of four receptors each) without unduly increasing the height of the combined motors. Tower 107 holds a mount or support 109 for bearings 111, each of which has a shaft 113 passing through it, with a bank of receptors above and another bank below the bearing. This arrangement balances forces on the bearings and together with other shock reducing means, such as the spring mechanisms and tethers, previously described, helps to reduce vibration. The power of the wind, which is converted to motions of the various receptors assemblies, may be combined by conventional means, such as belts and pulleys, gears and shafts, screws or other suitable means, not shown, and can be delivered to a central power shaft, not shown, which can transmit it to ground level or to other suitable location where it may be utilized or converted to another suitable form, e.g., electric power. However, because of the great height of the tower and its size, transmission of mechanical power to ground level can create problems (a very heavy shaft might be needed) so it is preferred that electric generators be located in or on (less preferred) support 109 to convert the powers of shafts 113 to electricity, which may be transmitted separately from the generators or combined. Use of such generators also obviates combining the mechanical powers of the sets of receptor banks.

In the foregoing descriptions of preferred embodiments of the invention only some of the embodiments within the inventive concept have been detailed. It is evident that the fundamental concept of a wind motor or turbine that turns in a plane of the wind direction and is automatically self-adjusting due to its structure to allow wind bypassing when a turbine element is moving against the wind can be used in many other embodiments. For example, although the vertical position of the power transmitting shaft and the horizontal plane of rotation of the receptors or cups are highly preferred, operations can be efficiently effected at shaft positions that are substantially vertical and in rotational planes that are substantially horizontal or even in planes and positions up to 30° from the horizontal and vertical, respectively, although at a loss in efficiency because the receptors would not always face maximum wind. Of course, the shaft could even be horizontal and the plane vertical but this would require means for always facing the receptors into the wind.

The various parts of the apparatuses will be made of suitably strong and weather resistant materials and the moving parts of the receptor banks will preferably be light in weight, to minimize inertia and diminish frictional effects. Thus, such parts and especially the receptors, will be made of materials such as aluminum, magnesium, light weight metallic alloys and synthetic organic resinous materials commonly referred to as plastics. The plastics used may be any suitable types but of these the polyesters, especially those which are fiberglass reinforced, are preferred. Such are described in Modern Plastics Encyclopedia, 1973–1974 (Vol. 50, No. 10A) at pages 66–68, 77 and 78. Other plastics that are useful include nylons, polymethyl methacrylates, polyethers, polypropylenes, phenol formaldehyde polymers and the "engineering plastics", all of which may be reinforced with fiberglass or other materials. The heavier materials of construction may be used in the towers, supports and non-moving parts of the apparatuses and also in the moving parts, providing that they are made thin enough. Thus, the material may have a specific gravity greater than 4, although it is preferred that this be lower than 3, if the receptor wall, for example, is less than 0.3 cm. thick, preferably less than 0.2 cm. For additional strength the walls may be ribbed or otherwise strengthened. Among the heavier materials sometimes employed are the various stainless steels, such as the iron-nickel-chromium alloys. With other less resistant materials friction reducing coatings such as the polytetrafluoroethylenes may be used, which also protect surfaces, such as receptor surfaces, from the elements and also oppose the sticking of snow to receptor surfaces.

The springs of the shock absorbers on the receptor banks and the tethers are made of suitable materials for their functions. Instead of springs there may be utilized plastic and rubber foams or solids and of the plastics polyurethanes are preferred (of the flexible type) while of the rubbers neoprene and butyl rubbers are considered to be best. Rubber and plastic tether straps are also applicable.

Self-lubricating bearings are preferably employed for apparatus elements normally out of ready reach but, if desired, the various bearings, moving parts and hinges may be lubricated by a forced system operated from ground level. Polytetrafluoroethylene parts or moving parts coated with similar friction-free materials may also be employed.

The wind receptors are preferably of a "flat hemispherical" shape, as illustrated in the drawing. However, it is within the invention to utilize other shapes, such as perfect hemispheres, flat hemispheres having lengthened and/or flattened outermost ends, cones, dishes and even plates. Also, the boundaries need not be circular or curved and may be square, rectangular, hexagonal, etc. Nevertheless, the best receptors are those which have a cup-like shape to trap the wind and which are rather flat. Thus, the width:depth ratio of the cups used will preferably be greater than 2, more preferably greater than 4 and almost always greater than 1. The cups or other receptors will have a thickness that is frequently less than 0.5 cm., preferably being from 0.2 to 0.4 cm.

In addition to varying receptor shapes it is within the invention to place additional receptors within the concavity or in front of the concavity of a main receptor. Also, instead of having the entire receptor pivot only a portion thereof, such as a central portion, may pivot within a non-pivoting portion of the cup (comparable to the lip). Plural sections of a receptor may pivot. Combinations of various shapes may be employed for best efficiency and effectiveness. Other variations apparent to those skilled in the art may also be made. For example, the receptors may be located so that several are held along an arm or so that the arms are branched, with each branch holding one or more receptors. Additionally, the cups may be rotatable so as to be featherable, if desired and to the extent wanted.

The advantages of the invention have already been mentioned, at least with respect to the major advances over the prior art. Primarily, the invention provides a self-adjusting wind motor that takes advantage of centrifugal force to maximize the power obtainable from the wind and which is operative no matter in which direction the wind blows. This is effected by the positioning of the pivoting means on the wind receptor cups on the outer portions thereof (on the halves of the cups nearer to the outside of the arc through which they rotate when in closed position), preferably on the outer quarter and most preferably on the outer tenth thereof. The wind motors described minimize shocks and vibrations in use and are adaptable to being converted to high or low power operations by additions of elements or removals thereof. Vibrations are lessened by use of designs like that of FIGS. 6 and 7, wherein the banks of receptors are mounted in sets on either side of bearings and wherein the sets are mounted on radiating, balanced support sections to minimize strains on the supporting tower. Vibration and strain are also held low by the use of a hydrophobic coating on the receptors, such as Teflon or modified Teflons, which prevent sticking of snow, soot, etc., and thereby aid in maintaining the receptors properly balanced. The swinging motion of the receptors and the repeated contacts with the supporting arms also help to dislodge any adherent materials. If the cups are so curved as to hold water in the lowermost portions thereof this may be drained by the simple expedient of having perforations made at such sections.

The invention allows control of the speed and torque generated by the motor and produces power at high and low wind speeds. Thus, receptors may be added to the arm assemblies and additional or fewer arm assemblies may be employed. It is preferred to use four arm assemblies with four receptors each but the banks may be of any desired and useful numbers of such. Preferably, there will be at least two arm assemblies and each will have at least two receptors. More preferably, from three to eight arm assemblies will be used and each will hold from three to eight receptors, with the most preferable ranges being from three to six. In addition to control by changing the number of receptors, torque may also be controlled by changing their sizes, inclinations and distances from the power shaft to which they are connected. Use of a circular cross-section arm facilitates rotation of the receptors to feathered or partially feathered positions to regulate power generated. In completely feathered positions the cups may be faced upwardly or may hang downwardly, as is usually preferred. The receptors may be moved inwardly or outwardly along the arms to modify torque and make them most suitable for wind conditions.

Thus, at low wind speeds the receptors are moved closer to the shaft and at high winds they are moved outwardly. The various movings of the receptors may be effected manually or automatically. If automatic, plunger, screw, scissors, spring loaded and otherwise extensible and rotatable mechanisms of known types may be used, responsive to mechanical action from the ground or to motor impulses and motions. Thus, the present motors may be operated in little wind or in gales without being ineffective or damaged. Wind speeds of from 3 to 100 miles per hour are useful but usually operation is with respect to wind velocities of 5 to 50 m.p.h.

Finally, although the present motors are most useful in stationary form they may also be employed as propulsion means, either directly or through motor-generator combinations, to drive automobiles, trucks, boats, ships, all-terrain vehicles and amphibian vehicles.

The invention has been described with respect to various illustrations of preferred embodiments thereof but it is evident that equivalents of elements thereof may be employed and substitutions may be made without departing from the invention.

What is claimed is:

1. A self-adjusting wind motor with a wind receptor that moves substantially in a plane of the wind, which automatically presents the wind receptor to the wind in a position of high wind resistance when moving in the direction of the wind and moves it into a position of low wind resistance when moving against the wind, said automatic self-adjustment of position or feathering being caused by the action of the wind and centrifugal force on the receptor, which comprises a rotatable shaft, an arm operatively connected to said shaft and extending from it and a wind receptor of curved or hollowed shape with the open face of the curve or hollow facing the wind in the position of high wind resistance, said wind receptor being held to the arm by pivot means at or near an end of said arm away from the shaft and said arm being of a shape to conform with the shape of the receptor when the receptor is in said position of high wind resistance and against the arm.

2. A wind motor according to claim 1 wherein a plurality of such wind receptors is operatively connected to the shaft.

3. A wind motor according to claim 2 wherein the shaft is vertical, the receptors rotate horizontally, are of cup-like or similar shape and are pivoted on the mounting arms, with the pivot locations being on outer portions of the cups or similar shapes, so as to present concave surfaces of the receptors to the wind when they are moving with it and sides of the receptors to the wind when they are moving against it.

4. A wind motor according to claim 3 wherein the receptors are of depths less than one-half the widths thereof and the arms are curved to fit the receptor shapes when the receptors are against the arms, thereby helping to steady them in position during operation.

5. A wind motor according to claim 4 wherein the receptors are tethered to the arms and spring or cushion means are provided on the arms, in locations facing the back surfaces of the receptors to prevent shocking contacts thereof with the arms during operation.

6. A wind motor according to claim 5 wherein the receptors are flat cups and curved portions of the arms facing the cups contain recesses for the tethers in which the tethers fit when the cups are against the arms, thereby allowing conforming of the shapes of the cups to those of the arms.

7. A wind motor according to claim 6 wherein each of a plurality of arms is removably held to a collar which is removably fastened to the shaft.

8. A wind motor according to claim 7 wherein a plurality of collars, each holding a plurality of arms and receptors, is removably held to the shaft and is interfitted with each other.

9. A wind motor according to claim 6 wherein the receptors and arms contain stops which contact each other at maximum desired feathering position to prevent over-feathering which might otherwise occur due to centrifugal force.

10. A wind motor according to claim 1 wherein the arm on which the wind receptor is mounted is removably held to a collar which is removably fastened onto the rotatable shaft.

11. A wind motor according to claim 26 wherein a plurality of such collars, each holding a plurality of arms and receptors, is held to the shaft.

12. A wind motor according to claim 3 wherein the shaft is vertical, rotates within a central bearing and has a plurality of cups or similarly shaped receptors mounted on arms held to the shaft above and below said bearing.

13. A wind motor according to claim 1 wherein the receptor is a thin, strong, light-weight material and has the inner curved or hollowed surface thereof coated with a hydrophobic coating to prevent sticking thereto of snow, soot and other deposits and thereby aid in maintaining the receptors properly balanced.

14. A wind motor according to claim 13 wherein the hydrophobic coating is polytetrafluoroethylene (Teflon®).

15. A wind motor according to claim 14 wherein the receptors which are flat cups are curved or otherwise constructed so as to drain any water therefrom in normal operating position.

16. A wind motor according to claim 1 wherein four arms, each curved to fit the wind receptors, are positioned at 90° from each other on a collar held to the shaft, with the curves of the arms and the positions of the receptors being such that the open ends of the receptors are facing in the same direction when each of the receptors is in its position of high wind resistance.

* * * * *